United States Patent
Miyamoto et al.

(10) Patent No.: US 10,263,434 B2
(45) Date of Patent: Apr. 16, 2019

(54) CHARGE AND DISCHARGE DEVICE, CHARGE AND DISCHARGE CONTROL METHOD, AND PROGRAM

(71) Applicant: NEC Corporation, Tokyo (JP)

(72) Inventors: Junichi Miyamoto, Tokyo (JP); Shingo Takahashi, Tokyo (JP); Yuan Luo, Tokyo (JP); Nobuhide Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 290 days.

(21) Appl. No.: 14/780,930

(22) PCT Filed: Mar. 27, 2014

(86) PCT No.: PCT/JP2014/058738
§ 371 (c)(1),
(2) Date: Sep. 28, 2015

(87) PCT Pub. No.: WO2014/157449
PCT Pub. Date: Oct. 2, 2014

(65) Prior Publication Data
US 2016/0043578 A1    Feb. 11, 2016

(30) Foreign Application Priority Data

Mar. 29, 2013    (JP) ................. 2013-071046

(51) Int. Cl.
*H02J 7/00* (2006.01)
*G01R 31/36* (2006.01)
(Continued)

(52) U.S. Cl.
CPC ......... *H02J 7/0016* (2013.01); *H01M 10/441* (2013.01); *H01M 10/482* (2013.01);
(Continued)

(58) Field of Classification Search
CPC ........ H02J 7/0014; H02J 7/0019; H02J 7/345; G01R 31/3658; H01M 2010/4271
(Continued)

(56) References Cited

U.S. PATENT DOCUMENTS

| 6,432,569 B1* | 8/2002 | Zeilinger | G01R 19/16542 |
| | | | 324/434 |
| 8,089,249 B2* | 1/2012 | Zhang | H02J 7/0016 |
| | | | 320/116 |

(Continued)

FOREIGN PATENT DOCUMENTS

| JP | 2000-270483 | 9/2000 |
| JP | 2005-312161 | 11/2005 |

(Continued)

OTHER PUBLICATIONS

International Search Report dated May 20, 2014 in corresponding PCT International Application.

*Primary Examiner* — David V Henze-Gongola
*Assistant Examiner* — Tarikh Kanem Rankine
(74) *Attorney, Agent, or Firm* — Finnegan, Henderson, Farabow, Garrett & Dunner, L.L.P.

(57) ABSTRACT

A charge and discharge device (10) includes: a battery unit (110) in which m (m is an integer of 3 or more) battery cells (112) that are connected in series are grouped into plural groups (114) including n (n is an integer equal to or larger than 2 and smaller than m) battery cells (112) that are continuously arranged and a part of the battery cells (112) that belong to a certain group is shared by a different group; a cell balance unit (120) that is provided for each group (114) and uniformizes voltages of the battery cells (112) that belong to the group (114); and a control unit (130) that stops the operation of the cell balance unit (120), when a voltage difference of the battery cells (112) that belong to an arbitrary one of the groups (114) is within a predetermined (Continued)

value, and when a total average voltage in all the battery cells (112) and a partial average voltage which is an average voltage of the battery cells (112) that belong to the arbitrary group (114) satisfy a specific condition, the cell balance unit (120) corresponding to the arbitrary group (114).

8 Claims, 5 Drawing Sheets

(51) Int. Cl.
  *H01M 10/44* (2006.01)
  *B60L 11/18* (2006.01)
  *H01M 10/48* (2006.01)
  *H01M 10/42* (2006.01)
  *H02J 7/34* (2006.01)

(52) U.S. Cl.
  CPC ... *H02J 7/0014* (2013.01); *H01M 2010/4271* (2013.01); *H02J 7/0019* (2013.01); *H02J 7/0021* (2013.01); *H02J 7/345* (2013.01); *Y02T 10/7055* (2013.01)

(58) Field of Classification Search
  USPC .......................................... 320/118, 134, 116
  See application file for complete search history.

(56) References Cited

U.S. PATENT DOCUMENTS

| | | | | |
|---|---|---|---|---|
| 8,519,670 | B2* | 8/2013 | Castelaz | H02J 7/0019 320/118 |
| 2004/0251874 | A1* | 12/2004 | Petitdidier | H02J 7/0016 320/118 |
| 2006/0080012 | A1* | 4/2006 | Nishina | B60L 11/185 701/36 |
| 2006/0273802 | A1* | 12/2006 | Murakami | G01R 31/3658 324/434 |
| 2007/0139006 | A1* | 6/2007 | Yasuhito | H01M 10/441 320/116 |
| 2010/0207579 | A1* | 8/2010 | Lee | H02J 7/0018 320/120 |
| 2011/0127963 | A1* | 6/2011 | Murao | H02J 7/0016 320/118 |
| 2011/0156649 | A1* | 6/2011 | Wu | H02J 7/0014 320/118 |
| 2011/0254502 | A1* | 10/2011 | Yount | B60L 3/0046 320/107 |
| 2012/0007558 | A1* | 1/2012 | Pigott | H02J 7/0018 320/118 |

FOREIGN PATENT DOCUMENTS

| | | |
|---|---|---|
| JP | 2007-330021 | 12/2007 |
| JP | 2009-278709 | 11/2009 |

* cited by examiner

CHARGE AND DISCHARGE DEVICE, CHARGE AND DISCHARGE CONTROL METHOD, AND PROGRAM

CROSS-REFERENCE TO RELATED PATENT APPLICATIONS

This application is a National Stage Entry of International Application No. PCT/JP2014/058738, filed Mar. 27, 2014, which claims priority from Japanese Patent Application No. 2013-071046, filed Mar. 29, 2013. The entire contents of the above-referenced applications are expressly incorporated herein by reference.

TECHNICAL FIELD

The present invention relates to a charge and discharge device, a charge and discharge control method, and a program capable of uniformizing voltages (capacities) of plural battery cells that are connected in series.

BACKGROUND ART

In use of plural battery cells that are connected in series, variation in voltages (capacities) thereof occurs according to a characteristic of each battery cell, a use environment, or the like. The variation of the voltages may cause over-charge or over-discharge. Further, when plural battery cells that are connected in series are used, charging is stopped at a voltage such that a battery cell that has the highest voltage is not over-charged during charging, and discharging is stopped at a voltage such that a battery cell that has the lowest voltage is not over-discharged during discharging. Thus, a use range of the entire series voltages becomes limited, and thus, usable capacities of the battery cells are reduced.

As an example of a technique that solves such a problem, there is a charge state control device of a battery pack disclosed in Patent Document 1. The charge state control device of the battery pack disclosed in Patent Document 1 includes plural battery cell groups including plural battery cells that are connected in series, plural capacitors, plural voltmeters, plural switching circuits respectively configured of plural switches, and a control circuit, in which a part of the battery cells belongs to both of two adjacent battery cell groups. With this configuration, the charge state control device disclosed in Patent Document 1 achieves uniformization of a charge state in each battery cell group and uniformization of a charge state between the respective battery cell groups.

RELATED DOCUMENT

Patent Document

[Patent Document 1] Japanese Laid-open Patent Publication No. 2000-270483

SUMMARY OF THE INVENTION

However, in the charge state control device disclosed in Patent Document 1, there is a concern that the uniformization of voltages of the entirety of the battery cells is insufficient. For example, in the charge state control device disclosed in Patent Document 1, it is assumed that the uniformization is performed so that the difference between the maximum voltage and the minimum voltage of the battery cells is within a predetermined range $\Delta V_d$ in each battery cell group and a voltage of the battery cell that belongs to both of two battery cell groups is V. Here, since the charge state control device disclosed in Patent Document 1 uniformizes the charge state for each battery cell group, the battery cell that belongs to both of the two battery cell groups may show the minimum voltage in one battery cell group, and may show the maximum voltage in the other battery cell group. That is, in the one battery cell group, since the battery cell that belongs to both of the two battery cell groups shows the minimum voltage, a variation range of the voltages in the one battery cell group may be $V+\Delta V_d$ to V. Further, in the other battery cell group, since the battery cell that belongs to both of the two battery cell groups shows the maximum voltage, a variation range of the voltages in the other battery cell group may be V to $V-\Delta V_d$. Accordingly, when the uniformization is completed in both the battery cell groups, a voltage difference of $2 \times \Delta V_d$ may occur in the entirety of the battery cells. That is, in the charge state control device disclosed in Patent Document 1, when there are m (m is an integer of 2 or more) battery cell groups, a maximum voltage variation of $m \times \Delta V_d$ may occur in the entirety of the battery cells.

An object of the invention is to provide a charge and discharge device, a charge and discharge control method, and a program capable of uniformizing voltages of plural battery cells that are connected in series with high accuracy.

According to an aspect of the invention, there is provided a charge and discharge device including: a battery unit in which m (m is an integer of 3 or more) battery cells that are connected in series are grouped into a plurality of groups including n (n is an integer equal to or larger than 2 and smaller than m) battery cells that are continuously arranged and a part of the battery cells that belong to a certain group is shared by a different group; a cell balance unit that is provided for each group, and selects a discharge battery cell and a charge battery cell from the battery cells that belong to the group corresponding to the cell balance unit and moves electric charges between the discharge battery cell and the charge battery cell so that a voltage difference of the battery cells that belong to the corresponding group is within a predetermined value; and a control unit that controls an operation of each cell balance unit, in which the control unit stops the operation of the cell balance unit, when a voltage difference of the battery cells that belong to an arbitrary one of the groups is within the predetermined value, and when a total average voltage in all the battery cells and a partial average voltage which is an average voltage of the battery cells that belong to the arbitrary group satisfy a specific condition, the cell balance unit corresponding to the arbitrary group.

According to another aspect of the invention, there is provided a control method executed by a control device that controls an operation of a battery unit in which m (m is an integer of 3 or more) battery cells that are connected in series are grouped into a plurality of groups each of which includes n (n is an integer equal to or larger than 2 and smaller than m) battery cells that are continuously arranged and apart of the battery cells that belong to a certain group is shared by a different group, and an operation of a cell balance unit that is provided for each group, and selects a discharge battery cell and a charge battery cell from the battery cells that belong to the group corresponding to the cell balance unit and moves electric charges between the discharge battery cell and the charge battery cell so that a voltage difference of the battery cells that belong to the corresponding group is within a predetermined value, in which the control device stops the operation of the cell balance unit, when a voltage difference of the battery cells that belong to an arbitrary one of the groups is within the predetermined value, and when a total average voltage in all the battery cells and a partial average voltage which is an average voltage of the battery cells that belong to the arbitrary group satisfy a specific condition, the cell balance unit corresponding to the arbitrary group.

According to still another aspect of the invention, there is provided a program that causes a function to be executed by a control device that controls an operation of a battery unit in which m (m is an integer of 3 or more) battery cells that are connected in series are grouped into a plurality of groups each of which includes n (n is an integer equal to or larger than 2 and smaller than m) battery cells that are continuously arranged and a part of the battery cells that belong to a certain group is shared by a different group, and an operation of a cell balance unit that is provided for each group, and selects a discharge battery cell and a charge battery cell from the battery cells that belong to the group corresponding to the cell balance unit and moves electric charges between the discharge battery cell and the charge battery cell so that a voltage difference of the battery cells that belong to the corresponding group is within a predetermined value, the function including: stopping the operation of the cell balance unit, when a voltage difference of the battery cells that belong to an arbitrary one of the groups is within the predetermined value, and when a total average voltage in all the battery cells and a partial average voltage which is an average voltage of the battery cells that belong to the arbitrary group satisfy a specific condition, the cell balance unit corresponding to the arbitrary group.

According to the invention, it is possible to uniformize voltages of plural battery cells that are connected in series with high accuracy.

BRIEF DESCRIPTION OF THE DRAWINGS

The above object, other objects, features and advantages of the invention will become more apparent from the following description of preferred exemplary embodiments and the accompanying drawings.

DESCRIPTION OF EXEMPLARY EMBODIMENTS

Figure 1:
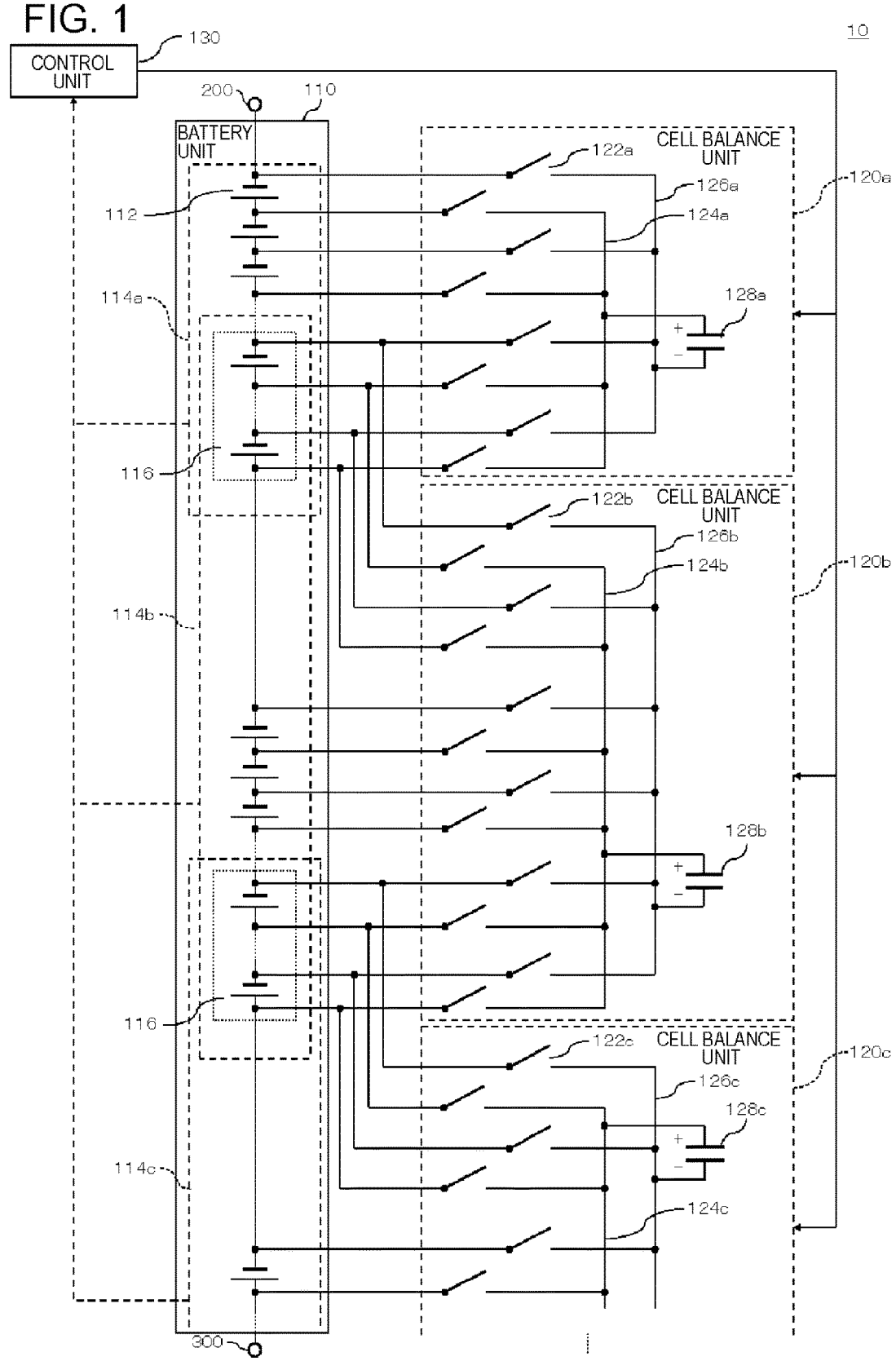
FIG. 1 is a diagram illustrating a processing configuration example of a charge and discharge device according to a first exemplary embodiment.

Hereinafter, exemplary embodiments of the invention will be described with reference to the accompanying drawings. The same reference numerals are given to the same components in all drawings, and description thereof will not be repeated.

First Exemplary Embodiment

FIG. 1 is a diagram illustrating a processing configuration example of a charge and discharge device 10 according to a first exemplary embodiment. In FIG. 1, the charge and discharge device 10 includes a battery unit 110, a cell balance unit 120, and a control unit 130.

The battery unit 110 includes m (m is an integer of 3 or more) battery cells 112 that are connected in series. The m battery cells 112 are grouped into plural groups 114 (114a to 114c in FIG. 1) configured of n (n is an integer equal to or larger than 2 and smaller than m) battery cells 112 that are continuously arranged. Further, as shown in FIG. 1, a part of the battery cells 112 that belong to a certain group 114 is shared by a different group 114. Hereinafter, the above-described shared battery cell 112 is referred to as a common battery cell 116. The number and position of the common battery cells 116 are not limited to the example shown in FIG. 1. Further, the battery unit 110 is a lithium ion battery or the like, for example. As shown in FIG. 1, the battery unit 110 is connected to an external negative terminal 200 and an external positive terminal 300. When the external negative terminal 200 and the external positive terminal 300 are connected to a power supply (not shown), the battery unit 110 is charged with power from the power supply. Further, when the external negative terminal 200 and the external positive terminal 300 are connected to a load (not shown), the battery unit 110 discharges power with respect to the connected load.

The cell balance unit 120 is provided for each group 114, as indicated by 120a to 120c in FIG. 1. Further, the cell balance unit 120 selects a discharge battery cell and a charge battery cell from the battery cells 112 that belong to the group 114 corresponding thereto, and moves electric charges between the discharge battery cell and the charge battery cell. The cell balance unit 120 repeats the movement of the electric charges between the discharge battery cell and the charge battery cell to suppress variation in voltages of the battery cells 112 that belong to the group 114 within a predetermined value. Hereinafter, an operation executed by the cell balance unit 120 is referred to as a cell balance operation. The cell balance operation is controlled by a control unit 130 which will be described later.

Further, in the present exemplary embodiment, as shown in FIG. 1, the cell balance unit 120 includes plural switching elements 122, buses 124 and 126, and a capacitor 128. Here, the switching element 122 is a field effect transistor (FET), a photo coupler, or the like. Further, the capacitor 128 is a capacitor, an electric double layer capacitor, a lithium ion capacitor, or the like.

As shown in FIG. 1, one end of each of the plural switching elements 122 is connected to each of the battery cells 112 that belong to the group 114. Further, the other ends of the plural switching elements 122 are alternately connected to the buses 124 and 126, respectively. In addition, the bus 124 is connected to a positive terminal of the capacitor 128. Furthermore, the bus 126 is connected to a negative terminal of the capacitor 128. Here, as one switching element 122 connected to the bus 124 and one switching element 122 connected to the bus 126 are respectively turned on, the battery cell 112 and the capacitor 128 are connected in parallel. Accordingly, electric charges are exchanged between the battery cell 112 and the capacitor 128.

Specifically, first, a battery cell 112 (discharge battery cell) selected by a combination of two switching elements 122 is connected to the capacitor 128. Thus, electric charges moves from the battery cell 112 (discharge battery cell) to the capacitor 128. Then, a different battery cell 112 (charge battery cell) selected by a different combination of two switching elements 122 is connected to the capacitor 128.

Thus, electric charges moves from the capacitor 128 to the battery cell 112 (charge battery cell). In this way, by moving the electric charges from a certain battery cell 112 to anther battery cell 112, it is possible to uniformize voltages in the group 114.

Further, the cell balance unit 120 may select a combination having the highest total voltage as the discharge battery cell from among combinations of n' (n' is an integer equal to or higher than 1 and smaller than n) series battery cells 112 including the battery cell 112 that has the maximum voltage in the group 114, and may select the battery cell 112 that has the minimum voltage among the battery cells 112 that belong to the group 114 as the charge battery cell. Accordingly, it is possible to increase electric charges to be charged in the capacitor 128, and to reduce a cell balance operation time.

In FIG. 1, a configuration in which the cell balance unit 120 includes the capacitor 128 is shown as an example, but the configuration of the cell balance unit 120 is not limited thereto. For example, a configuration in which the cell balance unit 120 uniformizes the voltages of the battery cells 112 using a DC-DC converter may be used. Further, a configuration in which the cell balance unit 120 uniformizes the voltages of the battery cells 112 using an inductor may be used. In addition, the cell balance unit 120 may have a configuration in which the DC-DC converter, the capacitor, and the inductor are provided together. The configurations employed as the cell balance unit 120 may be appropriately determined according to electric charge movement efficiency, product scale, manufacturing cost, or the like. Further, the configuration of the cell balance unit 120 using the DC-DC converter or the inductor may employ a known configuration.

The control unit 130 controls the operation of the cell balance unit 120. Specifically, first, the control unit 130 measures the voltages of all the battery cells 112 included in the battery unit 110. The control unit 130 has a voltage measurement unit (not shown) to measure a voltage of each battery cell 112. The voltage measurement unit may be disposed outside the control unit 130. In this case, the control unit 130 acquires and uses the voltage of each battery cell 112 measured by the voltage measurement unit. Further, the control unit 130 calculates an average voltage (total average voltage $V_{all}$) of all the battery cells 112 included in the battery unit 110 and an average voltage (partial average voltage $V_{gr}$) of the battery cells 112 that belong to each group 114, from the measured voltages. Further, the control unit 130 specifies the battery cell 112 that has the maximum voltage and the battery cell 112 that has the minimum voltage for each group, based on the measured voltage of each battery cell 112. Further, the control unit 130 determines whether a difference between the maximum voltage and the minimum voltage is within a predetermined voltage $\Delta V_d$, and whether the total average voltage $V_{all}$ and the partial average voltage $V_{gr}$ satisfy a specific condition, for each group 114. Further, the control unit 130 determines whether to stop the cell balance operation of each group 114 based on the determination result. The predetermined value $\Delta V_d$ is set in the control unit 130 in advance. Further, the predetermined value $\Delta V_d$ is retained in a storage unit (not shown), and the control unit 130 may read the predetermined value $\Delta V_d$ from the storage unit for use. When a termination condition of the cell balance operation is satisfied, the control unit 130 terminates the cell balance operation which has been executed by each cell balance unit. The "termination condition" may be when "the difference between the maximum voltage and the minimum voltage of the battery cells 112 that belong to the battery unit 110 is within the predetermined value", or may be when "a predetermined time has elapsed after a start of the cell balance operation starts and then a predetermined time elapses", for example.

Here, in the battery unit 110 where the cell balance operation is executed, there are a group 114 where the partial average voltage $V_{gr}$ is higher than the total average voltage $V_{all}$, and a group 114 where the partial average voltage $V_{gr}$ is lower than the total average voltage $V_{all}$. Thus, the "specific condition" is a condition that the cell balance operation is stopped with respect to at least one of the group 114 where the partial average voltage $V_{gr}$ is higher than the total average voltage $V_{all}$ and the group 114 where the partial average voltage $V_{gr}$ is lower than the total average voltage $V_{all}$, using the total average voltage $V_{all}$ as a boundary. Specifically, the "specific condition" means "partial average voltage $V_{gr}$≤total average voltage $V_{all}$" or "partial average voltage $V_{gr}$≥total average voltage $V_{all}$".

Here, it is preferable to set the "specific condition" as "partial average voltage $V_{gr}$≤total average voltage $V_{all}$", The reason is as follows. In the cell balance operation, considerable energy loss may occur. For example, when the capacitor is used as shown in FIG. 1, since accumulated electric energy becomes U=½CV², half the energy from the discharge battery cell is lost. That is, the partial average voltage $V_{gr}$ decreases whenever the cell balance operation is performed. Thus, by setting the "specific condition" to the "partial average voltage $V_{gr}$≤total average voltage $V_{all}$", in the group 114 where the partial average voltage $V_{gr}$ is equal to or lower than the total average voltage $V_{all}$, the number of cell balance operations is reduced, excluding a case where the voltages in the group 114 are uniformized. When discharging is performed from all the battery cells 112, it is possible to suppress the occurrence of over-discharge in the group 114 where the partial average voltage $V_{gr}$ is equal to or lower than the total average voltage $V_{all}$. Further, by setting such a specific condition, in the group 114 where the partial average voltage $V_{gr}$ is higher than the total average voltage $V_{all}$, even though the voltages in the group 114 fall within the range of the predetermined value $\Delta V_d$, the cell balance operation is continued. When charging is performed to all of the battery cells 112, it is possible to suppress the occurrence of over-charge in the group 114 where the partial average voltage $V_{gr}$ is higher than the total average voltage $V_{all}$.

The control unit 130 shown in FIG. 1 does not represent a configuration of a hardware unit, but represents a block of a function unit. The control unit 130 is realized by an arbitrary combination of hardware and software, which mainly includes a CPU, a memory, a program that is loaded in the memory to realize the components of FIG. 1, a storage medium that stores the program such as a hard-disk, and a network connecting interface, in an arbitrary computer. Further, the realization method and device include various modification examples.

Figure 2:
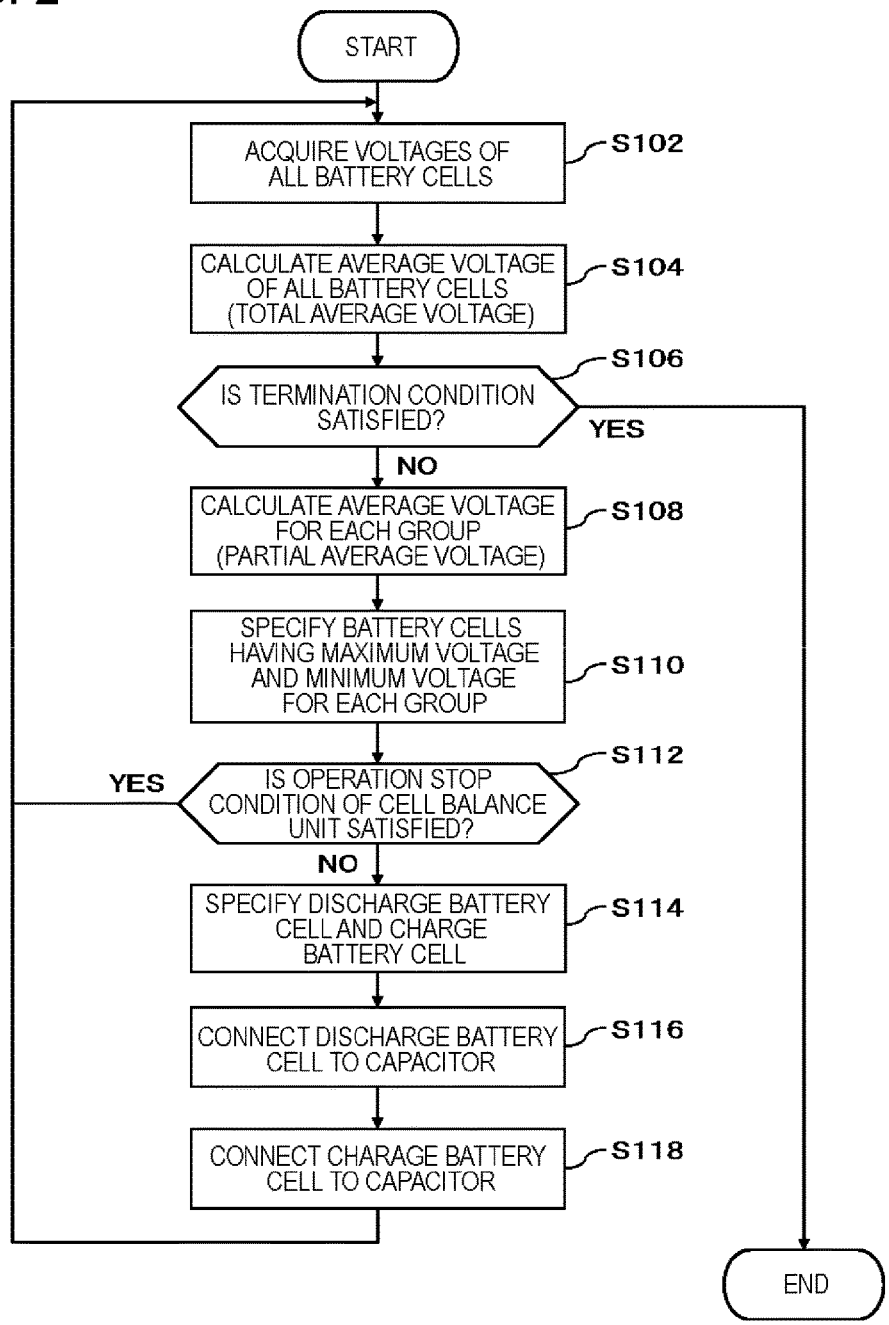
FIG. 2 is a flowchart illustrating the flow of processes of the charge and discharge device in the first exemplary embodiment.

The flow of processes of the charge and discharge device 10 of the first exemplary embodiment will be described with reference to FIG. 2. FIG. 2 is a flowchart illustrating the flow of the processes of the charge and discharge device 10 of the first exemplary embodiment.

The control unit 130 measures and acquires voltages of all the battery cells 112 that belong to the battery unit 110 (S102). When the cell balance unit 120 performs the cell balance operation, the battery cell 112 is connected to the capacitor 128 to cause electric current to flow, and the voltage shifts compared with the battery cell 112 that is not connected to the capacitor 128. Thus, when the voltage of the battery cell 112 that is connected to the capacitor 128, where electric charges are moving, is measured, the control unit 130 performs a correction process of applying a moving average filter to the measured voltages of the battery cell 112, for example, and uses a voltage value after the correction. Further, the control unit 130 calculates the total average voltage $V_{all}$ from the voltages of all the battery cells 112 acquired in S102 (S104).

Further, the control unit 130 determines whether the termination condition of the cell balance operation is satisfied for the entire battery unit 110 (S106). Here, when the termination condition is satisfied (S106: YES), the control unit 130 terminates the cell balance operation for the battery unit 110. On the other hand, when the termination condition is not satisfied (S106: NO), the control unit 130 executes the cell balance operation for the battery unit 110.

Specifically, the control unit 130 calculates the partial average voltage $V_{gr}$ which is an average voltage of the plural battery cells 112 connected to each cell balance unit 120 for each group 114 using the voltage of each battery cell 112 acquired in S102 (S108). Further, the control unit 130 specifies the battery cells 112 that have the maximum voltage and the minimum voltage from the battery cells 112 connected to each cell balance unit 120 (S110) to calculate the difference voltage $\Delta V_d$. Here, the control unit 130 retains information for identifying the battery cell 112 that has the maximum voltage and the battery cell 112 that has the minimum voltage in the group 114, such as a cell number.

Further, the control unit 130 determines whether the operation stop condition of the cell balance unit 120 is satisfied for each group 114 (S112). It is assumed that the "operation stop condition" represents "maximum voltage−minimum voltage≤predetermined value $\Delta V_d$" and "partial average voltage $V_{gr}$≤total average voltage $V_{all}$". When a certain group 114 satisfies the operation stop condition (S112: YES), the control unit 130 stops the cell balance operation of the group 114.

On the other hand, when a certain group 114 does not satisfy the operation stop condition (S112: NO), the control unit 130 controls the cell balance unit 120 corresponding to the group 114 to execute the cell balance operation. Specifically, first, the control unit 130 specifies a discharge battery cell and a charge battery cell (S114). Further, the control unit 130 transmits an instruction for connecting the charge battery cell and the discharge battery cell specified in S114 to the capacitor 128 to move electric charges, to the cell balance unit 120. First, the cell balance unit 120 switches ON/OFF states of the switching elements 122 according to the instruction to connect the discharge battery cell to the capacitor 128 (S116). When the discharge battery cell is connected to the capacitor 128 over a predetermined amount of time, electric charges move from the discharge battery cell to the capacitor 128. Further, after a predetermined time elapses, the cell balance unit 120 switches the ON/OFF states of the switching elements 122 according to the instruction to connect the charge battery cell to the capacitor 128 (S118). Thus, electric charges accumulated in the capacitor 128 in S116 move to the charge battery cell. The processes of S108 to S118 are independently executed for each cell balance unit 120.

Further, whenever the cell balance operation is executed by the cell balance unit 120, the total average voltage $V_{all}$ calculated in S102 to S104 is updated.

Finally, the control unit 130 repeats the processes of S102 to S118 until the termination condition of S106 is satisfied.

Figure 3:
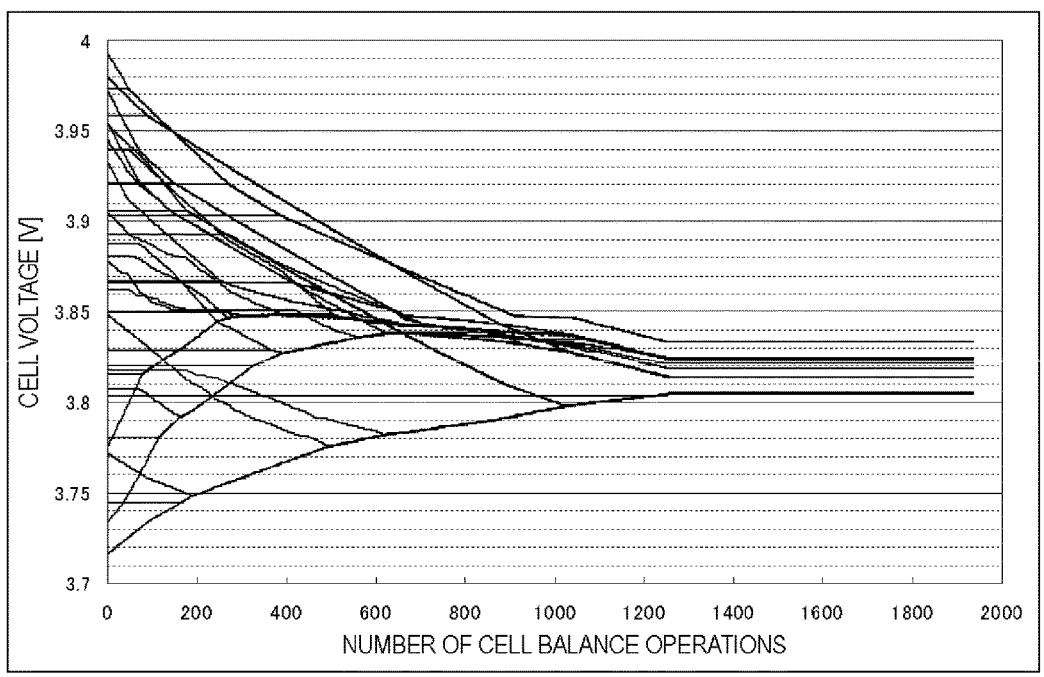
FIG. 3 is a diagram illustrating an example of a result obtained by executing a cell balance operation in the related art.

Here, FIG. 3 shows an example of a result obtained by executing a cell balance operation in the related art. Here, under conditions that the number of all battery cells included in a battery unit 110 is 40, 16 battery cells are connected to each cell balance unit 120, and four battery cells among the 16 battery cells are connected to a different cell balance unit 120, the cell balance operation is independently executed so that a predetermined value $\Delta V_d$ is within 0.01 [V], for each cell balance unit 120. As a result, in each cell balance unit 120, a variation of voltages is within $\Delta V_d$=0.01 [V], but in the entire battery unit 110, a variation of voltages is about 0.03 [V], and is not within $\Delta V_d$=0.01 [V].

Figure 4:
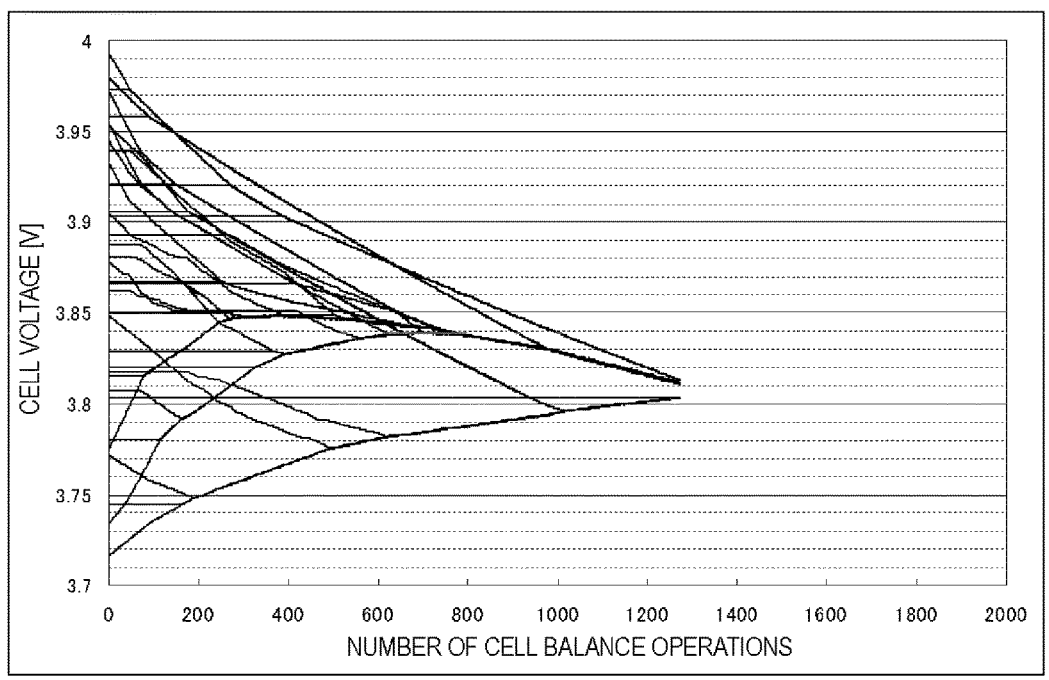
FIG. 4 is a diagram illustrating an example of a result obtained by executing a cell balance operation in the invention.

Further, FIG. 4 shows an example of a result obtained by executing the cell balance operation according to the invention. Here, the cell balance operation is executed under the same condition as in the related art. As shown in FIG. 4, according to the invention, a variation of voltages in the entire battery unit 110 is within $\Delta V_d$=0.01 [V].

As described above, in the present exemplary embodiment, even when the difference between the maximum voltage and the minimum voltage of the battery cells 112 in a certain group 114 is within the predetermined value $\Delta V_d$ (that is, when the voltages of the battery cells 112 that belong to the group 114 are uniformized), the cell balance operation is continued according to whether the partial average voltage $V_{gr}$ for each group 114 and the total average voltage $V_{all}$ of the battery unit 110 satisfy the specific condition. Thus, according to the present exemplary embodiment, it is possible to suppress variation in voltages between the groups 114, and to uniformize voltages of plural battery cells which are connected in series with high accuracy.

Second Exemplary Embodiment

The present exemplary embodiment is the same as the first exemplary embodiment, except for the following points.

Figure 5:
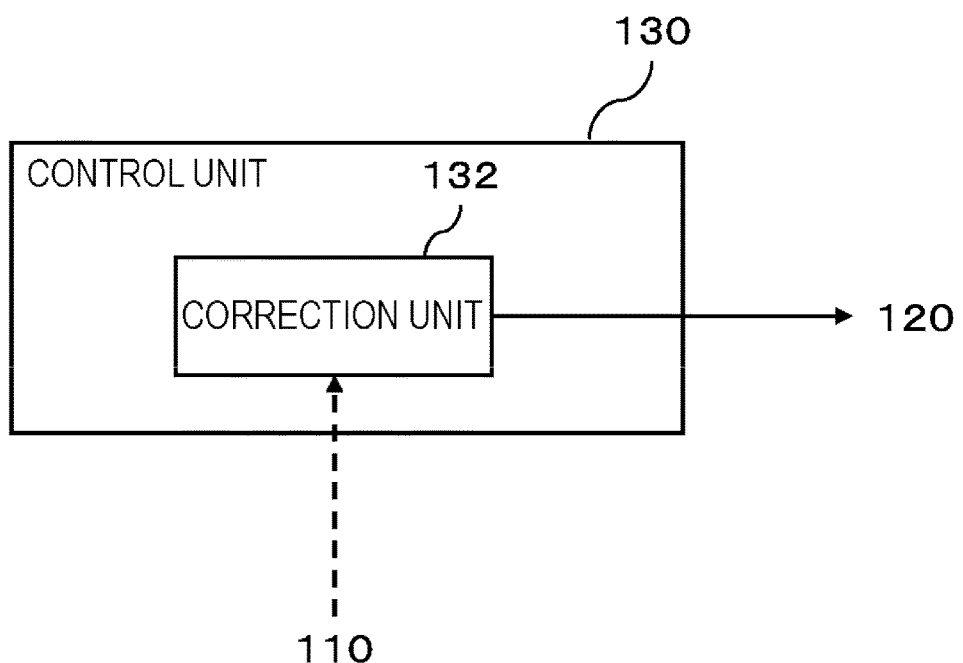
FIG. 5 is a diagram illustrating a configuration of a control unit according to a second exemplary embodiment.

FIG. 5 is a diagram illustrating a configuration of the control unit 130 in the second exemplary embodiment. The control unit 130 in the present exemplary embodiment further includes a correction unit 132.

The correction unit 132 corrects a numerical value of the total average voltage $V_{all}$ calculated by the control unit 130 using a correction value α. Further, the control unit 130 determines the specific condition described in the first exemplary embodiment using the numerical value of the total average voltage $V_{all}$ corrected by the correction unit 132. The correction value α will be described hereinafter. In the following description, it is assumed that the voltage of the battery cell 112 increases or decreases in proportion to the capacity of the battery cell 112.

First, before and after a first cell balance operation is executed, the total average voltage $V_{all}$ varies as shown in the following expression 1. In the expression 1, $V_0$ represents the total average voltage $V_{all}$ before executing the balance operation. Further, $V_m$ represents the total average voltage $V_{all}$ (prediction) after executing the balance operation m times. In addition, $\Delta V_{down}$ represents the amount of voltage drop (>0) of the discharge battery cell due to the balance operation. Further, $\Delta V_{up}$ represents the amount of voltage rise (>0) of the charge battery cell due to the balance operation. Further, n represents the number of all battery cells, s represents the number of discharge battery cells, and t represents the number of charge battery cells.

[Expression 1]

$$V_1 = \frac{V_0 \times n - \Delta V_{down} \times s + \Delta V_{up} \times t}{n} \quad \text{(Expression 1)}$$

Further, in the voltage drop amount $\Delta V_{down}$ of the discharge battery cell and the voltage rise amount $\Delta V_{up}$ of the charge battery cell, the relationship shown in the following expression 2 is established. Here, η represents movement efficiency of electric charges (0<η≤1).

[Expression 2]

$$\Delta V_{up} \times t = \Delta V_{down} \times s \times \eta \quad \text{(Expression 2)}$$

Further, the following expression 3 is derived from the expression 1 and the expression 2.

[Expression 3]

$$V_1 = V_0 - \frac{s \times (1-\eta) \Delta V_{down}}{n} \quad \text{(Expression 3)}$$

The total average voltage $V_{all}$ after executing the balance operation m times is generally expressed as the following expression 4 from the expression 3.

[Expression 4]

$$V_m = V_{m-1} - \frac{s \times (1-\eta) \Delta V_{down}}{n} \quad \text{(Expression 4)}$$

In the expression 4, the second term on the right side corresponds to the correction value α. Further, the correction value α is set as a value that satisfies "minimum voltage of voltages of all battery cells 112≤(total average voltage $V_{all}$+α)≤maximum voltage of voltages of all battery cells 112". Here, when the operation stop condition (disclosed in paragraph 0029) is set to "maximum voltage−minimum voltage≤predetermined value $\Delta V_d$", and "partial average voltage $V_{gr}$ entire average voltage $V_{all}$+α", as the correction value α becomes smaller, the number of the cell balance units 120 that continue the cell balance operation even though "maximum voltage−minimum voltage≤predetermined value $\Delta V_d$" is satisfied increases. Contrarily, as the correction value α becomes larger, the number of the cell balance units 120 that continue the cell balance operation even though "maximum voltage−minimum voltage≤predetermined value $\Delta V_d$" is satisfied decreases.

On the other hand, when the operation stop condition (disclosed in paragraph 0030) is set to "maximum voltage−minimum voltage≤predetermined value $\Delta V_d$", and "partial average voltage $V_{gr}$≥total average voltage $V_{all}$+α", as the correction value α becomes larger, the number of the cell balance units 120 that continue the cell balance operation even though "maximum voltage−minimum voltage≤predetermined value $\Delta V_d$" is satisfied increases. Contrarily, as the correction value α becomes smaller, the number of cell balance units 120 that continue the cell balance operation even though "maximum voltage−minimum voltage≤predetermined value $\Delta V_d$" is satisfied decreases.

In this way, in the present exemplary embodiment, as the correction unit 132 corrects the total average voltage $V_{all}$ using the correction value α, the number of the cell balance units 120 that continue the cell balance operation is controlled. Thus, according to the present exemplary embodiment, it is possible to complete the cell balance operation of the entire battery unit 110 more rapidly by adjusting the number of the cell balance units 120 that continue the cell balance operation into an appropriate value.

Hereinbefore, the exemplary embodiments of the invention have been described, but these are only examples of the invention, and various other configurations may be employed.

Further, in the flowchart used in the above description, plural steps (processes) are sequentially written, but an execution order of the processes executed in each exemplary embodiment is not limited to the described order. In each exemplary embodiment, the order of the processes shown in the figure may be variously modified in a range without departing from the concept of the invention.

Hereinafter, reference examples will be additionally disclosed.

1. A charge and discharge device including: a battery unit in which m (m is an integer of 3 or more) battery cells that are connected in series are grouped into plural groups including n (n is an integer equal to or larger than 2 and smaller than m) battery cells that are continuously arranged and apart of the battery cells that belong to a certain group is shared by a different group; a cell balance unit that is provided for each group, and selects a discharge battery cell and a charge battery cell from the battery cells that belong to the group corresponding to the cell balance unit and moves electric charges between the discharge battery cell and the charge battery cell so that a voltage difference of the battery cells that belong to the corresponding group is within a predetermined value; and a control unit that controls an operation of each cell balance unit, in which the control unit stops the operation of the cell balance unit, when a voltage difference of the battery cells that belong to an arbitrary one of the groups is within the predetermined value, and when a total average voltage in all the battery cells and a partial average voltage which is an average voltage of the battery cells that belong to the arbitrary group satisfy a specific condition, the cell balance unit corresponding to the arbitrary group.

2. The charge and discharge device according to 1, in which the control unit sets a condition where the partial average voltage is equal to or lower than the total average voltage as the specific condition.

3. The charge and discharge device according to 1 or 2, in which the control unit corrects a numerical value of the total average voltage based on a correction value, and determines the specific condition using the numerical value of the total average voltage after the correction.

4. The charge and discharge device according to any one of 1 to 3, in which the control unit controls the cell balance unit to select, as the discharge battery cell, a set of n' (n' is an integer equal to or higher than 1 and smaller than n) series battery cells having the highest total voltage from among sets of n' series battery cells including the battery cell having the maximum voltage in the group, and to select the battery cell having the minimum voltage in the group as the charge battery cell.

5. The charge and discharge device according to any one of 1 to 4, in which the cell balance unit includes a capacitor, and moves the electric charges of the discharge battery cell and the charge battery cell using the capacitor.

6. The charge and discharge device according to any one of 1 to 4, in which the cell balance unit includes a DC-DC converter, and moves the electric charges of the discharge battery cell and the charge battery cell using the DC-DC converter.

7. A control method executed by a control device that controls an operation of a battery unit in which m (m is an integer of 3 or more) battery cells that are connected in series are grouped into plural groups each of which includes n (n is an integer equal to or larger than 2 and smaller than m) battery cells that are continuously arranged and a part of the battery cells that belong to a certain group is shared by a different group, and an operation of a cell balance unit that is provided for each group, and selects a discharge battery cell and a charge battery cell from the battery cells that belong to the group corresponding to the cell balance unit and moves electric charges between the discharge battery cell and the charge battery cell so that a voltage difference of the battery cells that belong to the corresponding group is within a predetermined value, in which the control device stops the operation of the cell balance unit, when a voltage difference of the battery cells that belong to an arbitrary one of the groups is within the predetermined value, and when a total average voltage in all the battery cells and a partial average voltage which is an average voltage of the battery cells that belong to the arbitrary group satisfy a specific condition, the cell balance unit corresponding to the arbitrary group.

8. A program that causes a function to be executed by a control device that controls an operation of a battery unit in which m (m is an integer of 3 or more) battery cells that are connected in series are grouped into plural groups each of which includes n (n is an integer equal to or larger than 2 and smaller than m) battery cells that are continuously arranged and a part of the battery cells that belong to a certain group is shared by a different group, and an operation of a cell balance unit that is provided for each group, and selects a discharge battery cell and a charge battery cell from the battery cells that belong to the group corresponding to the cell balance unit and moves electric charges between the discharge battery cell and the charge battery cell so that a voltage difference of the battery cells that belong to the corresponding group is within a predetermined value, the function including: stopping the operation of the cell balance unit, when a voltage difference of the battery cells that belong to an arbitrary one of the groups is within the predetermined value, and when a total average voltage in all the battery cells and a partial average voltage which is an average voltage of the battery cells that belong to the arbitrary group satisfy a specific condition, the cell balance unit corresponding to the arbitrary group.

9. The control method according to 7, in which the control device sets a condition where the partial average voltage is equal to or lower than the total average voltage as the specific condition.

10. The control method according to 7 or 9, in which the control device corrects a numerical value of the total average voltage based on a correction value, and determines the specific condition using the numerical value of the total average voltage after the correction.

11. The control method according to any one of 7, 9, and 10, in which the control device controls the cell balance unit to select, as the discharge battery cell, a set of n (n' is an integer equal to or higher than 1 and smaller than n) series battery cells having the highest total voltage from among sets of n' series battery cells including the battery cell having the maximum voltage in the group, and to select the battery cell having the minimum voltage in the group as the charge battery cell.

12. The control method according to any one of 7 and 9 to 11, in which the cell balance unit includes a capacitor, and moves the electric charges of the discharge battery cell and the charge battery cell using the capacitor.

13. The control method according to any one of 7 and 9 to 11, wherein the cell balance unit includes a DC-DC converter, and moves the electric charges of the discharge battery cell and the charge battery cell using the DC-DC converter.

14. The program according to 8 that causes the control device to execute a function of determining a condition where the partial average voltage is equal to or lower than the total average voltage as the specific condition.

15. The program according to 8 or 14 that causes the control device to execute a function of correcting a numerical value of the total average voltage based on a correction value and determining the specific condition using the numerical value of the total average voltage after the correction.

16. The program according to any one of 8, 14 and 15 that causes the control device to control the cell balance unit to select, as the discharge battery cell, a set of n (n' is an integer equal to or higher than 1 and smaller than n) series battery cells having the highest total voltage from among sets of n' series battery cells including the battery cell having the maximum voltage in the group, and to select the battery cell having the minimum voltage in the group as the charge battery cell.

17. A cell balance device that uniformizes voltage in a battery unit in which m (m is an integer of 3 or more) battery cells that are connected in series are grouped into plural groups including n (n is an integer equal to or larger than 2 and smaller than m) battery cells that are continuously arranged and a part of the battery cells that belong to a certain group is shared by a different group, the cell balance device including: a cell balance unit that is provided for each group, and selects a discharge battery cell and a charge battery cell from the battery cells that belong to the group corresponding to the cell balance unit and moves electric charges between the discharge battery cell and the charge battery cell so that a voltage difference of the battery cells that belong to the corresponding group is within a predetermined value; and a control unit that controls an operation of each cell balance unit, in which the control unit stops the operation of the cell balance unit, when a voltage difference of the battery cells that belong to an arbitrary one of the groups is within the predetermined value, and when a total average voltage in all the battery cells and a partial average voltage which is an average voltage of the battery cells that belong to the arbitrary group satisfy a specific condition, the cell balance unit corresponding to the arbitrary group.

18. The cell balance device according to 17, in which the control unit sets a condition where the partial average voltage is equal to or lower than the total average voltage as the specific condition.

19. A cell balance control method executed by a cell balance device that uniformizes voltage in a battery unit in which m (m is an integer of 3 or more) battery cells that are connected in series are grouped into plural groups including n (n is an integer equal to or larger than 2 and smaller than m) battery cells that are continuously arranged and apart of the battery cells that belong to a certain group is shared by a different group, the cell balance device including: a cell balance unit that is provided for each group, and selects a discharge battery cell and a charge battery cell from the battery cells that belong to the group corresponding to the cell balance unit and moves electric charges between the discharge battery cell and the charge battery cell so that a voltage difference of the battery cells that belong to the corresponding group is within a predetermined value; and a control unit that controls an operation of each cell balance unit, the method comprising:

stopping the operation of the cell balance unit, when a voltage difference of the battery cells that belong to an arbitrary one of the groups is within the predetermined value, and when a total average voltage in all the battery cells and a partial average voltage which is an average voltage of the battery cells that belong to the arbitrary group satisfy a specific condition, the cell balance unit corresponding to the arbitrary group.

20. The cell balance control method according to 19, in which the control unit sets a condition where the partial average voltage is equal to or lower than the total average voltage as the specific condition.

The present application claims priority from Japanese Application JP2013-071046 filed on Mar. 29, 2013, the content of which is hereby incorporated by reference into this application.

The invention claimed is:

1. A charge and discharge device comprising:
a battery unit in which m (m is an integer of 3 or more) battery cells that are connected in series are grouped into a plurality of groups including n (n is an integer equal to or larger than 2 and smaller than m) battery cells that are continuously arranged and a part of the battery cells that belong to a certain group is shared by a different group;
a cell balance unit that is provided for each group, and selects a discharge battery cell and a charge battery cell from the battery cells that belong to the group corresponding to the cell balance unit and moves electric charges between the discharge battery cell and the charge battery cell so that a voltage difference of the battery cells that belong to the corresponding group is within a predetermined value; and
a control unit that controls an operation of each cell balance unit,
wherein the control unit stops the operation of the cell balance unit, when a voltage difference of the battery cells that belong to an arbitrary one of the groups is within the predetermined value, and when a total average voltage in all the battery cells and a partial average voltage which is an average voltage of the battery cells that belong to the arbitrary group satisfy a specific condition,
wherein the specific condition is when the partial average voltage≤the total average voltage or the partial average voltage≥the total average voltage.

2. The charge and discharge device according to claim 1, wherein the control unit sets a condition where the partial average voltage is equal to or lower than the total average voltage as the specific condition.

3. The charge and discharge device according to claim 1, wherein the control unit corrects a numerical value of the total average voltage based on a correction value, and determines the specific condition using the numerical value of the total average voltage after the correction.

4. The charge and discharge device according to claim 1, wherein the control unit controls the cell balance unit to select, as the discharge battery cell, a set of n' (n' is an integer equal to or higher than 1 and smaller than n) serial battery cells having the highest total voltage from among sets of n' series battery cells including the battery cell having the maximum voltage in the group, and to select the battery cell having the minimum voltage in the group as the charge battery cell.

5. The charge and discharge device according to claim 1, wherein the cell balance unit includes a capacitor, and moves the electric charges of the discharge battery cell and the charge battery cell using the capacitor.

6. The charge and discharge device according to claim 1, wherein the cell balance unit includes a DC-DC converter, and moves the electric charges of the discharge battery cell and the charge battery cell using the DC-DC converter.

7. A control method executed by a control device that controls an operation of a battery unit in which m (m is an integer of 3 or more) battery cells that are connected in series are grouped into a plurality of groups each of which includes n (n is an integer equal to or larger than 2 and smaller than m) battery cells that are continuously arranged and a part of the battery cells that belong to a certain group is shared by a different group, and
an operation of a cell balance unit that is provided for each group, and selects a discharge battery cell and a charge battery cell from the battery cells that belong to the group corresponding to the cell balance unit and moves electric charges between the discharge battery cell and the charge battery cell so that a voltage difference of the battery cells that belong to the corresponding group is within a predetermined value,
the method comprising:
causing the control device to stop the operation of the cell balance unit, when a voltage difference of the battery cells that belong to an arbitrary one of the groups is within the predetermined value, and when a total average voltage in all the battery cells and a partial average voltage which is an average voltage of the battery cells that belong to the arbitrary group satisfy a specific condition, the cell balance unit corresponding to the arbitrary group,
wherein the specific condition is when the partial average voltage≤the total average voltage or the partial average voltage≥the total average voltage.

8. A non-transitory computer readable medium storing a program that causes a function to be executed by a control device that controls an operation of a battery unit in which m (m is an integer of 3 or more) battery cells that are connected in series are grouped into a plurality of groups each of which includes n (n is an integer equal to or larger than 2 and smaller than m) battery cells that are continuously arranged and a part of the battery cells that belong to a certain group is shared by a different group, and an operation of a cell balance unit that is provided for each group, and selects a discharge battery cell and a charge battery cell from the battery cells that belong to the group corresponding to the cell balance unit and moves electric charges between the discharge battery cell and the charge battery cell so that a voltage difference of the battery cells that belong to the corresponding group is within a predetermined value, the function comprising:
stopping the operation of the cell balance unit, when a voltage difference of the battery cells that belong to an arbitrary one of the groups is within the predetermined value, and when a total average voltage in all the battery cells and a partial average voltage which is an average voltage of the battery cells that belong to the arbitrary group satisfy a specific condition, the cell balance unit corresponding to the arbitrary group, wherein the specific condition is when the partial average voltage≤the total average voltage or the partial average voltage≥the total average voltage.

* * * * *